(12) United States Patent
Genilloud et al.

(10) Patent No.: US 11,640,501 B2
(45) Date of Patent: May 2, 2023

(54) METHOD AND DEVICE FOR VERIFYING THE AUTHOR OF A SHORT MESSAGE

(71) Applicant: Orphanalytics SA, Verbier (CH)

(72) Inventors: Guy Genilloud, Neyruz (CH); Alexandre-Pierre Cotty, Aproz (CH); Antoine Jover, Burgistein (CH); Adrien Donnet-Monay, Puidoux (CH); Florent Devillard, Lausanne (CH); Constanze Andel Rimensberger, Geneva (CH); Valentin Roten, Blonay (CH); Stefan Codrescu, Ecublens (CH); Alain Favre, Nods (CH); Luc-Olivier Pochon, Cormondrèche (CH); Lionel Pousaz, Boston, MA (US); Claire Roten, Vevey (CH); Stéphanie Riand, Sion (CH); Serge Nicollerat, Voluntary (RO); Myriam Eugster, Vevey (CH); Jean-Luc Buhlmann, Saint-Julien-en-Genevois (FR); Léonard Andrè Henri Studer, Villeneuve (CH); Claude-Alain Roten, Vevey (CH)

(73) Assignee: Orphanalytics SA, Verbier (CH)

( * ) Notice: Subject to any disclaimer, the term of this patent is extended or adjusted under 35 U.S.C. 154(b) by 0 days.

(21) Appl. No.: 17/048,531

(22) PCT Filed: Apr. 12, 2019

(86) PCT No.: PCT/IB2019/053037
§ 371 (c)(1),
(2) Date: Oct. 16, 2020

(87) PCT Pub. No.: WO2019/202450
PCT Pub. Date: Oct. 24, 2019

(65) Prior Publication Data
US 2021/0174017 A1 Jun. 10, 2021

(30) Foreign Application Priority Data

Apr. 20, 2018 (CH) .................................. 00510/18
Jul. 4, 2018 (CH) .................................. 00835/18

(51) Int. Cl.
*G06F 40/216* (2020.01)
*G06F 40/253* (2020.01)
*G06K 9/62* (2022.01)

(52) U.S. Cl.
CPC .......... *G06F 40/216* (2020.01); *G06F 40/253* (2020.01); *G06K 9/6219* (2013.01)

(58) Field of Classification Search
CPC .... G06F 40/216; G06F 40/253; G06K 9/6219
(Continued)

(56) References Cited

U.S. PATENT DOCUMENTS 5,754,938 A * 5/1998 Herz ................. H04N 21/23106
348/E7.071
7,421,418 B2 * 9/2008 Nakano .................. G06F 16/334
707/E17.075
(Continued)

FOREIGN PATENT DOCUMENTS

EP 3782054 A1 * 2/2021 ........... G06F 40/216
WO WO-2008/036059 A1 3/2008
(Continued)

OTHER PUBLICATIONS

Sayoud, Halim. "A Visual Analytics based Investigation on the Authorship of the Holy Quran." IVAPP. 2015.*
(Continued)

*Primary Examiner* — Edwin S Leland, III
(74) *Attorney, Agent, or Firm* — Blank Rome LLP

(57) ABSTRACT

A method for verifying whether a queried text of less than 500 characters has been compiled by an author, comprising the following steps:
(Continued)

multivariate statistical analysis of the queried text, for example, PCA or PCoA, in order to generate a matrix of coordinates in a space with N dimensions;
hierarchical clustering of the points of this space that can be represented by a dendrogram;
verification of the author of the queried text on the basis of this clustering.

20 Claims, 9 Drawing Sheets

(58) Field of Classification Search
USPC .................................................. 704/9
See application file for complete search history.

(56) References Cited

U.S. PATENT DOCUMENTS

| | | | | |
|---|---|---|---|---|
| 7,483,871 | B2* | 1/2009 | Herz | H04N 21/222 |
| 11,093,476 | B1* | 8/2021 | Neeman | G06F 16/951 |
| 2012/0254333 | A1* | 10/2012 | Chandramouli | G06F 40/10 |
| | | | | 709/206 |
| 2013/0041652 | A1* | 2/2013 | Zuev | G06F 40/55 |
| | | | | 704/8 |
| 2013/0138428 | A1* | 5/2013 | Chandramouli | G06F 40/40 |
| | | | | 704/9 |
| 2019/0050388 | A1* | 2/2019 | Eugster | G06F 40/253 |
| 2019/0279281 | A1* | 9/2019 | Kumar | G06Q 30/0631 |
| 2021/0174017 | A1* | 6/2021 | Genilloud | G06F 40/253 |

FOREIGN PATENT DOCUMENTS

| | | | |
|---|---|---|---|
| WO | WO-2017144939 A1 | 8/2017 | |
| WO | WO-2019202450 A1 * | 10/2019 | ........... G06F 40/216 |

OTHER PUBLICATIONS

International Search Report for PCT/IB2019/053037 dated Jul. 18, 2019, 1 page.
H. Gomez-Adorno, et al., "Author Clustering using Hierarchical Clustering Analysis", Notebook for PAN at CLEF 2017, 8 pgs.
R. Layton, et al., "Authorship Attribution for Twitter in 140 Characters or Less", 2010 Second Cybercrime and Trustworthy Computing Workshop, IEEE, 8 pgs.
M. Eder, "Visualization in Stylometry: Cluster Analysis Using Networks", Digital Scholarship in the Humanities, vol. 32, No. 1, 2017, 16 pgs.

* cited by examiner

METHOD AND DEVICE FOR VERIFYING THE AUTHOR OF A SHORT MESSAGE

RELATED APPLICATIONS

This application is a national phase of PCT/IB2019/053037, filed on Apr. 12, 2019, which claims priority to Swiss Application No. CH00510/18, filed on Apr. 20, 2018 and Swiss Application No. CH00835/18, filed on Jul. 4, 2018, The entire contents of these applications are hereby incorporated by reference.

TECHNICAL FIELD

The present invention relates to the problem of the assignment of an author to a text, in particular to a short text, for example a text of less than 500 characters.

PRIOR ART

The knowledge of the true author of a text is often important for reasons of copyright, of document authentication, or in forensics, for example for identifying the author of an anonymous letter, of a suicide note, for certifying the author of an e-mail, of a message on Twitter, of a publication on another social network, etc.

Various solutions have therefore been provided in order to authenticate or to identify the author of a document.

WO2008/036059 describes a method for identifying an author based on the linguistic analysis of units of the text. The linguistic analysis is for example based on lexical analysis, including the frequency of appearance of certain words or of prepositions, together with the stylometric analysis, including the punctuation, the average length of the words, the number of short words, or the average length of the paragraphs. A graphemic analysis including counting up the letters and the punctuation marks, and a syntactical analysis including counting up the nouns, the verbs, etc., are also provided. The analysis is carried out on each sentence or on the whole document. It is therefore designed for the authentication of complete documents.

JGAAP (Java Graphical Authorship Assignment Program) is a modular Java program which, at the date of filing of the present invention, may be downloaded from the website https://github.com/evllabs/JGAAP.

In its version 6.0, it allows the stylometric and textometric analysis of text with the aim of categorizing and assigning an author.

The patent application WO2017144939, the content of which is included here by reference, describes a method and a device for detecting a rupture of style by calculating a stylometric distance between portions or windows of the text. This method is particularly suited to the detection of plagiarized or "ghostwritten" passages inside of a longer document. The methods described are however not well suited to the verification of an author of a very short text, for example a text of less than 500 characters.

BRIEF SUMMARY OF THE INVENTION

There accordingly exists a need for a method of author verification specially designed for short texts, for example texts of less than 500 characters, or even of less than 160 characters, and which may be automated and executed for example by means of a machine or of a data processing system.

There also exists a need for a method which improves the efficiency and the speed of the methods of verification of authors of short texts, by virtue of a method which comprises steps that can be carried out in an efficient manner with a computer or a digital processing system.

According to one aspect of the invention, these aims are achieved notably by means of parameters characterizing the style of the document, or of a window in the document. The choice of these style parameters and/or their value may be determined automatically. They advantageously allow the style of a window to be automatically and objectively characterized.

Another subject of the invention is a method allowing it to be verified whether a queried text, complete or fragmented, of less than 500 characters has been written by an author, comprising the following steps:

multivariate statistical analysis of the queried text, in such a manner as to generate a matrix of coordinates in an N-dimensional space;

hierarchical clustering of the points of this space representable by a dendrogram, verification of the author of the queried text on the basis of this clustering.

This method may be carried out by a computer or another digital processing system. It offers the advantage of only comprising steps able to be implemented efficiently by a digital processing system, but which would be on the other hand very difficult or practically impossible to be carried out without the assistance of such a system.

With respect to the existing methods for verification of authors, this method therefore allows a high performance and efficient computer implementation.

The queried text may be a complete text, for example a message of less than 500 characters, or a fragment of less than 500 characters extracted from a complete text.

The clustering consists of a grouping of the points.

This hierarchical clustering minimizes the distances in a dendrogram (these are cophenetic distances).

According to one aspect, the method of the invention thus combines two statistical analysis tools which are normally used independently of one another: an MSA (multivariate statistical analysis, for example a PCA or a PCoA) and a clustering of the distances represented by a tree, more precisely a dendrogram.

This clustering may implement methods of the UPGMA, Minimum Variance, WPGMA, NJ type for example. The result of the MSA is a matrix of coordinates with N dimensions which is subjected to a hierarchical clustering of the distances between points of a multidimensional space.

The result obtained may be represented by a dendrogram which, if robust, allows it to be decided whether a text may be assigned to an author, or not.

The method may comprise the establishment of a measurement of robustness of the dendrogram by means of a cophenetic correlation coefficient. This technique for evaluating the dendrogram more often allows the results of the method even where the cophenetic correlation coefficient is medium, or even low, to be used.

Other techniques for evaluating the dendrogram, including techniques specific to the problem of author assignment, may be implemented.

A visual confirmation of the robustness of a dendrogram may be obtained by comparing its structure with that of other dendrograms obtained by different clustering methods (UPGMA, Minimum Variance, WPGMA, NJ, etc.).

The robustness of a dendrogram is furthermore testable either by statistically analyzing the measurements of cophenetic distances, or by comparing the proximity relationships of the leaf nodes of the dendrogram.

The author assignment is made by confirming or by infirming the distribution of the texts according to a starting hypothesis, HD1, according to which the queried text is assigned to an author.

In order to test the robustness of HD1, the queried text or texts are compared one after the other with texts from at least two reference authors (known authors who have certified the production of their texts). These reference texts are similar in nature, in number and in size to the queried texts.

For example, with the author queried in HD1 and 15 reference authors, 560 (16!/[3!*13!]) dendrograms, which test three authors by comparison, are generated. In the present approach based on the structure of the dendrogram, each author is tested by pair of authors 210 times. A statistical countdown is established in order to determine the number of times where the hypothesis on which each dendrogram is based is verified. The frequency of results in favor of the hypothesis is established. The 350 tests, which only compare reference authors, allow the height of the signal required for the acceptance of the hypothesis of the author assignment of the queried texts to be established. The robustness of the approach is tested by formulating a new hypothesis HD2, for example by adding to the texts queried in HD1 one or more additional texts from the same author or from another author. Several starting hypotheses, relating to texts for which the author is to be assigned, are thus testable in parallel.

According to one aspect, the invention also starts from the observation that semantic patterns (for example the number of occurrences of words or of lemmas) in a short text are not very useful for identifying an author, because this type of pattern is statistically too rare to provide a reliable indication of the author. The idea of the method of the invention is consequently to only use relatively frequent patterns, for example letter patterns.

In order to further increase the number of occurrences of these letter patterns, and hence their representativity, the method also provides the normalization of the text, by replacing all the upper case letters by lower case ones, and all the accented letters by the corresponding basic lower case character (for example the letter "4" is replaced by "e", "ç" by "c", etc.). Surprisingly, it is observed that this normalization does not affect the discriminating character of the patterns.

According to one aspect, the problem of the verification of the author of a queried short text, for example a text of less than 500 words, is in particular solved by virtue of a method comprising the following steps:

normalization of the queried text and/or of one or more reference texts, by, eliminating the punctuation marks, by replacing the upper case letters with lower case ones, and by replacing the accented letters or other variations of the basic letters with the main form of the corresponding letters:

automatic cutting up of the queried text and/or of one or more reference texts into a plurality of windows, at least two windows intersecting;

determination by processor of the number of occurrences of predefined patterns in said windows, said predefined patterns comprising exclusively intra and/or inter-word letter patterns, analysis of said occurrence numbers:

comparison of the results of said analysis with the results of an analysis carried out on a text from the author.

In the case of a text written in a Latin alphabet, the normalization preferably converts the basic text into a text comprising only 27 characters (26 letters and the <space> symbol).

The cutting up is advantageously independent of the content; for example, it is advantageous to cut up a text or another sequence of symbols into windows all, or almost all, with the exception for example of the first or of the last, having the same length. This characteristic allows comparisons to be made with windows of optimum length, in other words neither too short in order to avoid measurements of style being disrupted by rare events, nor too long in order to allow a detection of plagiarism of short sequences.

The length of the windows is advantageously in the range between 150 and 2000. In this case, the queried text is accordingly not cut up; however, the reference text or texts, which may be longer, will be cut up.

The windows are preferably offset from one another by t characters, certain windows comprising a portion of the end of the text and a portion of the start of the text. This cyclization allows the final stylometric signal to be stabilized.

The patterns preferably correspond either:
to trigrams (for example <aaa>, <aab>, <aac>); and/or
to bigrams with n intercalated letters <a*a>, <a*b>, etc.); these are referred to as multi-intercalator bigrams; and/or
to bigrams at the start of words, in the middle of words or at the end of words, or to inter-word bigrams.

It is also possible to combine different types of these patterns in a single text.

For example, if unigrams, bigrams, trigrams, etc. are used, these are referred to as patterns in the form of n-gram multigrams.

It is also possible to detect word start n-grams, combined with word end n-grams. These are then referred to as word-boundary (start, middle and end) multigrams.

It is also possible to use multigrams of other types: syllables, lengths of words, functions of the words (parts of speech), punctuation, etc.

The various types of multigrams may also be combined together: for example, combine n-gram multigrams with multi-intercalator bigrams.

The use of patterns of words or of lemmas, too infrequent in a short text to provide a reliable statistical base, are thus avoided.

The analysis may be a multivariate analysis (PCA or PCoA).

The method may comprise a step for clustering of the results of the multivariate analysis (UPGMA, Minimum Variance, WPGMA, NJ, etc.).

The analysis may be based on a measurement of distance to the barycenters.

The method may comprise the establishment of a dendrogram in order to determine whether two texts have been produced by the same author.

The queried text is assigned to an author by confirming or by infirming a distribution of the text according to an assignment hypothesis.

Several queried texts may be compared one after the other with texts from at least two reference authors.

In one embodiment, it is first of all tested whether a group of queried texts is far from two other groups of reference texts, from known authors, with which it is compared;

if the group of queried texts is sufficiently far from the other two reference text groups, two sub-clusters of queried texts are created starting from the group of queried texts, according to their distance to one of said reference text groups, and the difference between the average of the cophenetic distances between the fragments of each sub-cluster with a reference text group are determined in order to determine whether the two sub-clusters originate or do not originate from the same author.

The type of distance used during the multivariate statistical analysis may be selected according to the analysis strategy. For example, a Boolean distance will preferably be chosen for a short text, and another distance, for example a Euclidian distance, for a longer text. The type of distance used for the construction of the dendrogram may be selected.

A first type of distance will for example be chosen for a multivariate approach, and a second type of distance for an approach based on a dendrogram, and a third type for an approach based on the distance to a barycenter.

The type of distance used for the measurement of the distances to the barycenters may be selected according to the analysis strategy. The distances with statistical weighting (for example the standardized Euclidian distance, weighted according to the standard deviation), and also the Boolean or binary distances, will preferably not be applied for this approach.

At each of these levels, the choice of the type of selectionable distance comprises at least two distances, for example two distances to be chosen from between the following distances: distance of cords, Euclidian, Normalized Euclidian, Manhattan, Canberra, Khi squared [$\chi^2$], and generalized Jaccard distance.

The style of each portion of text is thus determined based on very simple elements of language, a little like determining the gothic style of a cathedral by studying its stones used for size instead of concentrating on the overall impression.

According to one aspect, the invention arises from the observation that these language bricks are highly personal and difficult to manipulate. The style parameters of each portion of text thus constitute a biometric trace of the stylometric signature of the author. It is observed that the style parameters associated with each author depend on their way of thinking, a little like the musical phrasing expressed by a jazz player is highly personal.

The letter patterns in a text naturally depend on the type of text. In French, a medical text exhibits a high occurrence of the trigrams "ose" or "ite".

Other patterns are more personal. Very surprisingly, some people systematically employ certain trigrams, or certain other patterns, etc. more often than others—independently of the type of text, of the level of education or of the literary style.

In one preferred embodiment, several hundred patterns are calculated for some or all the windows. The stylometric distance then depends on a large number of separate style parameters, thus rendering any attempt to imitate the style of another author very difficult.

The method may comprise the calculation of a stylometric distance between the numbers of occurrences of patterns in a text to be verified and a reference text: for example a distance of cords, Euclidian, normalized Euclidian, Manhattan, Canberra, Khi squared ($\chi^2$), etc. distance. It may be measured between two windows, between a window and a group of windows or between two groups of windows representing all or part of one or more sequences of letters.

The analysis of the occurrences of predefined patterns may comprise groupings by various multivariate statistical processing techniques. For example, a principal component analysis (PCA), or a principal coordinate analysis (PCoA, also referred to as MDS—MultiDimensional Scaling) operating on the mathematical distances defined between observations of the style parameters (for example the bigrams) reduces the number of original dimensions (the number of types of bigrams). Such groupings allow the style parameters most characteristic of an author to be detected.

In one variant, the Euclidian distance is carried out without multivariate statistical processing. This approach is more sensitive to noise, since the stylometric distance between two windows takes all the style parameters into account, even the least individual. On the other hand, it does avoid averaging the most characteristic style parameters with less personal parameters, or neglecting style parameters that are very individual but rarely occur.

BRIEF DESCRIPTION OF THE FIGURES

Exemplary embodiments of the invention are indicated in the description illustrated by the appended figures in which.

EXEMPLARY EMBODIMENTS OF THE INVENTION

Figure 1:
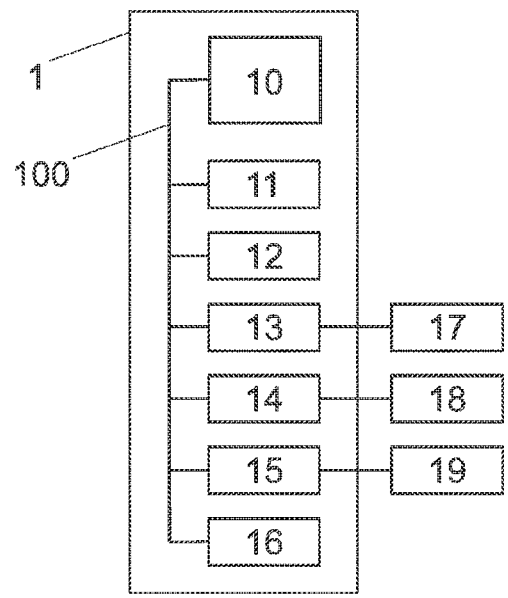
FIG. 1 illustrates by way of example a data processing device notably comprising some of the components needed for the implementation of the invention.
Figure 2:
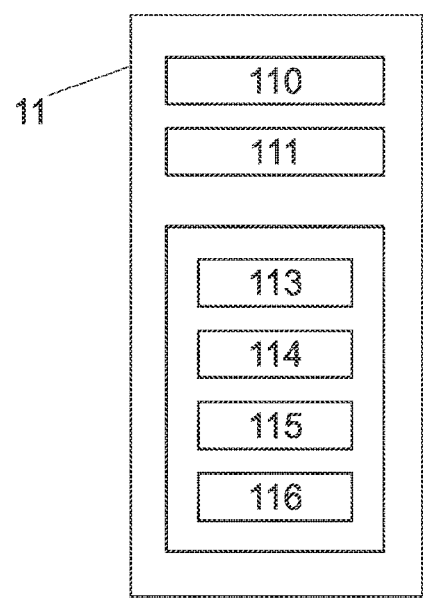
FIG. 2 illustrates the memory of the device in FIG. 1.

The method for detecting ruptures of style described in this application notably has the advantage of being able to be implemented by means of a data processing device 1, for example a computer or a server such as that illustrated schematically in FIG. 1. This device notably comprises one or more processors 10, a volatile memory 11, a non-volatile memory 12, a graphics card 13 for controlling a screen 17, an input-output port, for example a USB port 14, allowing the connection of external peripheral devices such as a scanner 18, printer, etc., a network card 15 for connecting to a network 19, for example an Ethernet network, and peripheral data input devices such as a keyboard, mouse, touchscreen, etc.

The memory 11 comprises a portion 110 for the operating system, a portion 111 for the data and a portion 112 for the application programs. This portion 112 notably comprises a window-splitting module 113, a module for determining stylistic parameters 114, a module for calculating stylistic distance 115, and a module for identifying ruptures of style 116. The "modules" hereinabove are advantageously formed by portions of computer code, for example programs, extracts of programs, subroutines, procedures, etc., arranged to be executable by the microprocessor 10 in order to cause it to execute the window-splitting operations, the determination of stylistic parameters, the calculation of stylistic distance, and the identification of ruptures of style, respectively, which will be described below by way of example. These modules may be stored on a data storage medium, for example a CD-ROM, a hard disk, a flash memory, etc., prior to being loaded into the memory 11 as illustrated.

The method allows the style of a document to be verified, and it to be compared with the style of a reference document in order to determine whether they have been written by the same author. The term 'style' is understood to mean the catalogue of occurrence of predefined letter patterns.

The first step of the method therefore consists in obtaining an electronic copy of at least one short text to be tested (queried text) and at least one reference text from the author to be verified (reference text). The reference text may be longer than the queried text. This sequence of symbols may be downloaded for example from the Internet, via e-mail, from a removable data storage medium, etc.

A window-splitting module 113 normalizes the text to be queried and at least one reference text, by eliminating the punctuation marks, the accents from the accented letters, replacing the variations of a letter by the basic form ("ç"→"c", etc.) and replacing the upper case by lower case letters. In the case of a Latin text, a normalized text formed of 27 different characters at the most (26 letters of the alphabet plus the <space>) is therefore obtained. This number of letters may be different for a text written in another alphabet.

Before or after normalization, the window-splitting module 113 cuts up at least one reference text, and potentially the queried text, into a plurality of windows 20A, 20B, etc. Each window 20 is composed of a series of L consecutive letters within the complete sequence.

The cutting up into windows is preferably independent of the content; it is not therefore cut up into grammatical or syntactical elements, and is independent for example of the start or of the end of the phrases, sentences, paragraphs or pages. This allows an analysis with window sizes independent of the style of the author. This also allows an analysis of the punctuation sequences by windows of fixed length.

A cutting up into windows according to the content may also be envisioned.

Figure 3:
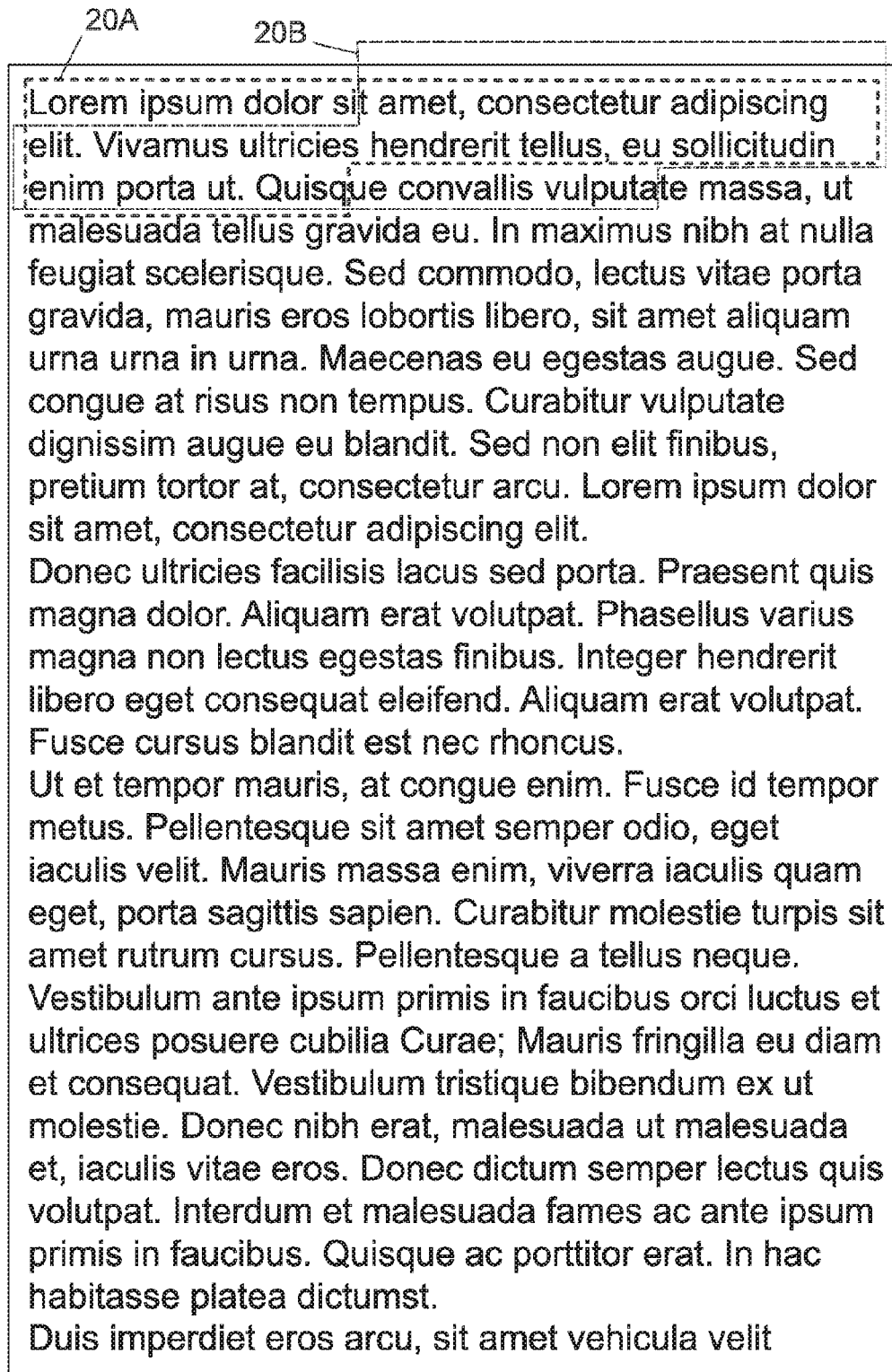
FIG. 3 illustrates one example of a sequence of symbols, in this case a document of the text type, and of window splitting within this text.

According to one aspect, the windows 20 are partially overlapping, in the sense that some symbols, or even the majority of the symbols, belong simultaneously to several windows. On the example in FIG. 3, the window 20A comprises the series of characters
Lorem ipsum dolor sit amet, consectetur adipiscing elit. Vivamus ultricies hendrerit tellus, eu sollicitudin enim porta ut. Quisq
whereas the following window 20B comprises the series
t amet, consectetur adipiscing elit. Vivamus ultricies hendrerit tellus, eu sollicitudin enim porta ut. Quisque convallis vulputa With the exception of the first 20 symbols of the window 20A and of the last 20 symbols of the window 20B, the two windows 20A and 20B are therefore identical. The window 20B is obtained from the first window 20A and from the sequence of symbols 2 by an offset of K symbols, here 20. Offset values K different from 20 may also be used, as long as K is less than the length L of the windows. The offset value may be a parameter chosen by the user during the execution of the program, depending on the type of documents, the processing power available, the required precision, etc. The offset value may be derived from one or other parameters chosen by the user. For example, the user chooses a degree of coverage C, indicating the number of windows to which each symbol must simultaneously belong, and the value of K is calculated accordingly.

The module 114 subsequently determines the number of occurrences of predefined patterns in each window. The number of patterns taken into account within each window may be large; for example, in the case of a calculation of trigrams, the number of possible trigrams will be 27*27*27.

The patterns taken into account are exclusively patterns able to occur in statistically representative quantities in a short text. Semantic patterns will preferably be excluded, the probability of finding the same word several times in a short text being low. The occurrences of the following patterns may be counted:

Number of occurrences of predefined trigrams within the window—a trigram being composed of a series of three consecutive letters.

Number of occurrences of series of predefined characters in the window, each series being able to comprise one or more replacement intercalator characters (<a*a>, <a*b>, etc.; <aa>, <ab>, etc., where the intercalator character * represents any given character). A final count is established by establishing a catalogue of cumulative usage of the intercalators, i.e. to the catalogue of frequency of usage of the nominal bigram (27×27=729 possibilities), in other words without intercalator, are added the catalogue of frequency of bigrams with 1 intercalator (27×27), then the catalogue of bigrams with 2 intercalators (27×27), etc., then the catalogue of bigrams with 3 intercalators (27×27), so as to obtain a profile of usage of 0 to n intercalators ((27×27)×((n+1)) dimensions which will be analyzed by the multivariate analysis (PCA/PCoA).

Number of occurrences of linking bigrams, taking into account for example the last letter of the preceding word and the first letter of the following word. The linking bigrams may also be counted up with one or more intercalator words; in this case, instead of counting up the bigrams in the linkages of words 1 and 2, then 2 and 3, etc., the bigrams in the linkage of the words 1 and 3, then 2 and 4, etc., are counted up for example. This example corresponds to a linking of words with an intercalator of 1.

Distribution of word start and/or word end N-grams, etc. For example intra word linking bigrams (bigrams at the start of words, in the middle of words or at the end of words, e.g. enchainement) or as an inter-word bigram (inter_mot): alone or together (27×27 or . . . 4×27×27).

In one embodiment, the occurrences of patterns counted up comprise a cumulation of the bigram, trigram, etc. signals in order to perform a multivariate analysis over all of these dimensions. This is referred to as a multivariate of n-gram multigrams.

These various occurrences of patterns, or some of these occurrences, may be cumulated, potentially with weightings over the dimensions. The analysis thus comprises a principal component analysis (PCA) multivariate statistical processing in order to group together the countings of various patterns. In one variant, the analysis comprises a PCoA (Principal Coordinate Analysis).

Figure 4:
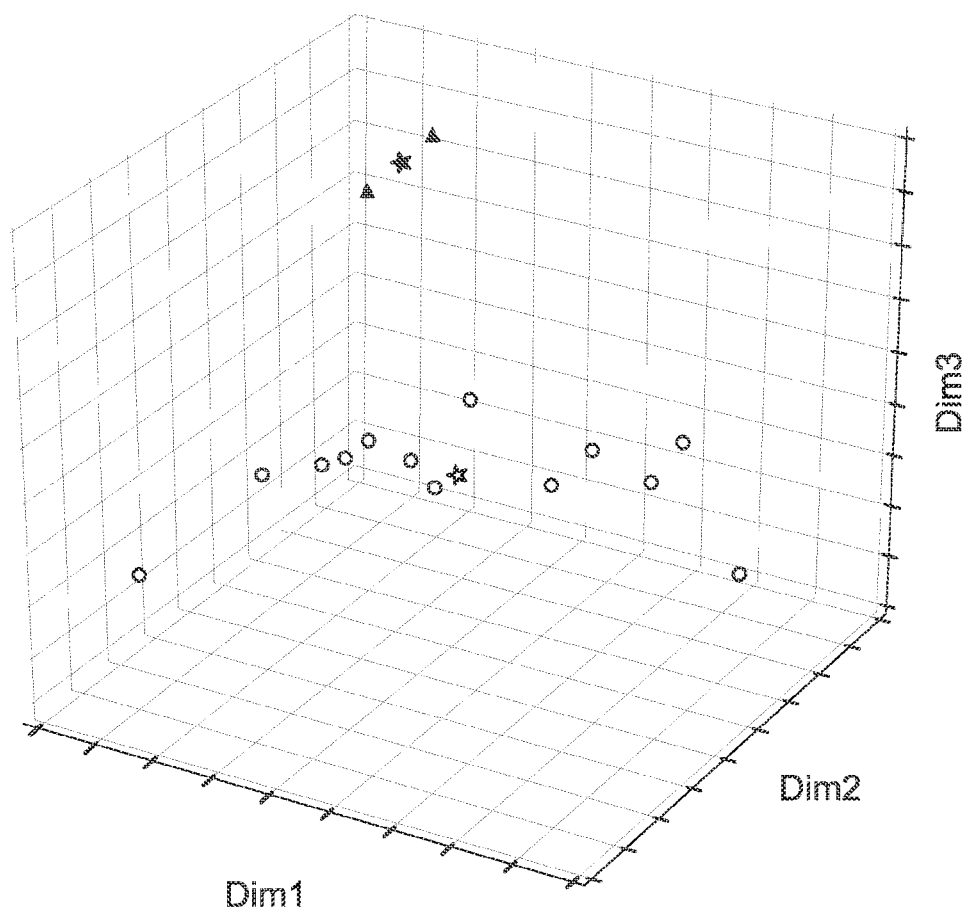
FIG. 4 illustrates the position in a three-dimensional space of 17 windows each represented by a symbol resulting from a multivariate analysis.

FIG. 4 illustrates the position in a three-dimensional space of 17 windows, each represented by a symbol, resulting from a multivariate analysis. Each axis may for example correspond to the frequency of a pattern; in one variant, each axis corresponds to a dimension obtained after a multivariate analysis, according to the reduction in dimensions of a multivariate statistical processing for optimizing the variance between windows carried by the style parameters. The circles correspond to windows written by a first author, the two triangles to windows written by a second author; the stars correspond to the mean points of the groups of windows corresponding to each of the two authors. It is clear that the number of dimensions may be much higher than three in the case where more than three different patterns are extracted from each window 20 and that these patterns are not grouped.

Figure 5:
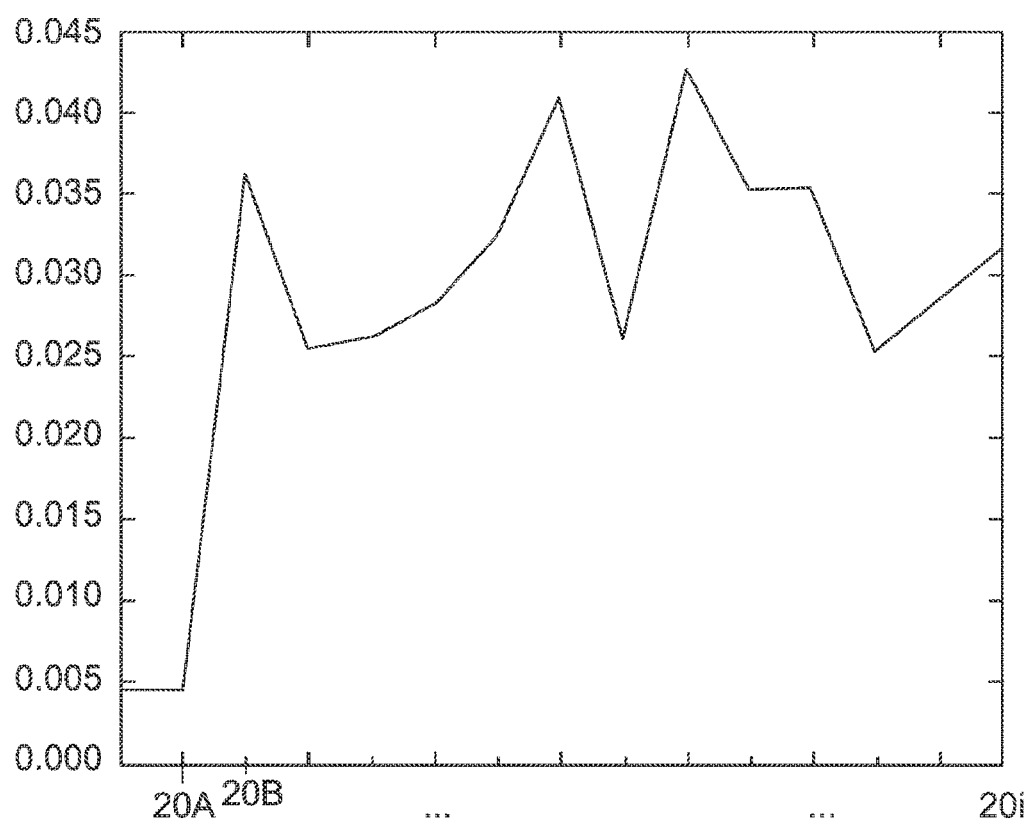
FIG. 5 illustrates graphically the stylistic distance between various windows of a sequence of symbols and a reference window or a set of reference windows.

FIG. 5 charts the distance to the mean point of each window (20A, 20B, . . . , 20i) on a curve. The large jump in distance between the window 20A and the window 20B at the start of the sequence shows a rupture of style between these two windows and is an indication of a change of author. The mathematical stylometric distance between points may be a Euclidian distance, a Manhattan distance, or a cos θ distance for example.

In one embodiment, the stylometric distance employed is a Boolean distance, for example a distance between two binary vectors (referred to as binary distance), each component of the vector indicating the presence or the absence of a stylometric pattern. A Jaccard, Rogers-Tanimoto, Simpson or Yule Sigma distance may for example be employed. A description of these types of distances and of their usage in clustering is presented by Seung-Seok Choi et al. in "A Survey of Binary Similarity and Distance Measures", SYSTEMICS, CYBERNETICS AND INFORMATICS, Vol. 8, num. 1, 2000.

This type of distance allows a large number of dimensions to be used and is therefore particularly suited to the aforementioned cumulated approaches, in which a large number of different patterns are counted up. They therefore allow a distance to be measured between a large number of dimensions for an object of small size, for example a short text.

The module for calculating stylometric distance 115 subsequently groups the extracts of text by calculating the stylometric distance between points of the multidimensional space represented by a dendrogram. The various queried and reference texts are grouped by means of a classification/clustering method, such as UPGMA, UPGMC, Minimum Variance, WPGMA, WPGMC, NJ, etc.).

In one embodiment, the result of the multivariate statistical analysis, a matrix of coordinates with N dimensions, is thus employed in order to construct a taxonomy.

The result of this grouping is a dendrogram, in other words a diagram which represents affinities (similarities of style) between texts, which may be queried texts or reference texts. The grouping of these texts is based on the matrix of coordinates, which indicates the (dis)similarities or distances between texts. Texts with very similar styles are carried together by a common branch of the dendrogram.

A robust dendrogram allows it to be decided whether a queried text may be assigned to one author of the match, to several, or not. No reliable decision can on the other hand be taken if the dendrogram is not sufficiently robust.

A standard measurement of robustness of a dendrogram is the cophenetic correlation coefficient. It is based on the cophenetic distances between the fragments, measured on the dendrogram. These distances are different from the original distances between the same fragments but measured in the MSA. The cophenetic correlation coefficient evaluates the relationship between the cophenetic distances (coming from the dendrogram) and the "original" distances (between the fragments in the MSA).

A confirmation of the robustness of a dendrogram may be obtained by comparing its structure with that of other dendrograms obtained by different clustering methods (UPGMA, Minimum Variance, WPGMA, NJ, etc.).

The robustness of a dendrogram is furthermore testable either by analyzing statistically the measurements of cophenetic distances, or by comparing the relationship of proximity of the leaf nodes of the dendrogram.

In one mode of statistical evaluation, an ad hoc technique for evaluating the dendrogram specific to the problem of author assignment is implemented. The latter more often allows the results of the present procedure to be used, even when the cophenetic correlation coefficient is medium, or even low.

This technique takes place in two steps:

In a first step, it is tested whether the group of queried texts (Q) is significantly distant from the other two groups of reference texts (A and B), from known authors, with which it is compared. For each pair of groups (QQ, QA, QB, AA, AB and BB), the average of the distances between the fragments of texts from the two groups of the pair is calculated, with their standard deviation and their frequency (i.e. number of fragments of texts). Subsequently, for each group, its confidence interval is calculated, which is the distance on either side of the average which contains a fraction, for example 95%, of the fragments of text of this group (95%, if an acceptability threshold of 5% has been chosen, for example). If the distance between the averages of Q and A, for example, is greater than the sum of their respective confidence intervals, the two groups Q and A are distinct with a probability of 95%. The operation is repeated with Q and B for estimating whether Q is distinct from B. If Q is distinct from A and from B, the method goes to the second step.

In a second step, the branch of the tree (dendrogram) which contains the fragments of the group Q forming a cluster is sometimes automatically divided into several sub-clusters by means of an algorithm. The statistical hypothesis HO is formulated: there exist two distinct sub-clusters Q1 and Q2.

Firstly, the distances of the fragments of the cluster Q are tested with respect to the cluster A. For this purpose, all the fragments of the cluster Q whose cophenetic distance to the cluster A is greater than the average distance of all the fragments of Q with respect to this same group are put into the sub-cluster Q1. Correspondingly, all the fragments of the cluster Q whose cophenetic distance to the cluster A is less than the average distance of all the fragments of Q with respect to this same group are put into the sub-cluster Q2.

If the difference between the average of the cophenetic distances between the fragments of Q1 with A and the average of the cophenetic distances between the fragments of Q2 with A is greater than the sum of the confidence intervals associated with them, the statistical hypothesis HO is accepted: the clusters Q1 and Q2 are distinct; hence, there are four clusters in the dendrogram in question (Q1, Q2, A and B). The experiment does not therefore allow it to be established that Q1 and Q2 are from the same author. In the opposite case (if this difference is less than the sum of the confidence intervals), the statistical hypothesis HO is rejected: it may then be stated that Q1 and Q2 are from the same author with a probability of being wrong equal to the probability threshold chosen for calculating the confidence interval.

The clustering of the group of queried texts therefore amounts to partitioning all of the queried texts into at least two groups such that the stylometric distance between members of a group is reduced.

In the embodiment described above, the MSA calculates the coordinates of the extracts of texts over N dimensions, N being the number of dimensions needed to reach a cumulated percentage of variance (e.g., 90%). In other words, all the coordinates are used with a coefficient 1 for the N main dimensions, which carry the discriminating signal, and 0 for the other dimensions, whose signal is noisy. In another embodiment, weighting coefficients are implemented in order to give more weight to the first dimensions, depending on their importance.

The module 116 determines, on the basis of the dendrogram, whether the queried text comes from the same author as one of the texts, or all of the reference texts A, B.

The cophenetic correlation coefficient may be calculated and displayed.

For example, in order to measure whether two texts to be analyzed (queried texts) have been produced by the same author, these two may be compared with four texts from a database (for example two texts produced by two authors A and B). If the two queried texts (Q1 and Q2) have been produced by a single author, they will form one branch (Q1 and Q2) in the dendrogram, and two other branches (A and B) will be formed by the authors A and B, respectively. If Q1 and Q2 have been produced by two authors, the dendrogram will produce four branches (Q1, Q2, A and B).

In order to validate the process, the texts from the authors A and B may be replaced by texts from other authors:
for 2 reference authors: 1 experiment
for 3 reference authors: 3 possible experiments: 1+2=3
for 4 reference authors: 6 possible experiments: 3+3=6
for 5 reference authors: 10 possible experiments: 6+4=10
for 6 reference authors: 15 possible experiments: 10+5=15

A final statistic on the results with, for example, 6 reference authors allows it to be known whether the two queried texts in this example behave as the text from one author or not.

In one embodiment, several author assignment tests with several types of complementary statistical validations are carried out, using texts of the same nature (for example two texts coming from a blog, two threatening messages, etc.). These texts of the same nature are used as reference texts, coming from at least three known authors, and are collected for this purpose. For example, the performance of 10 independent tests (with 10 different reference authors) allows the probability of being wrong to be reduced by a factor 10. In the present example, this probability would go from 5% to 0.5%.

As an alternative to the mode of statistical evaluation described hereinabove, an approach by structural analysis of dendrograms may be implemented after having defined three useful types of structure.

Figure 9:
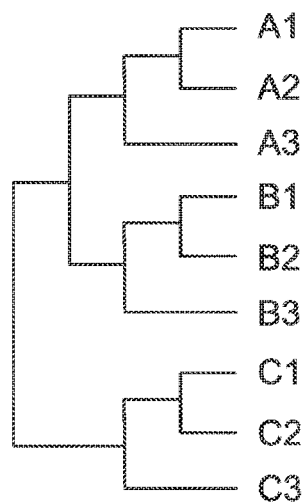
FIG. 9 illustrates one example of a perfect dendrogram.

A dendrogram will be called perfect if it has a perfect distribution, in other words if it groups the texts of presumed styles/authors into as many main branches as styles/authors. FIG. 9 accordingly illustrates one example of a perfect dendrogram. The three presumed authors or styles A, B and C are clustered according to the three main branches of the dendrogram. In this figure, the distance between A1 and B1 is equal to the distance between A1 and B2 and to that between A2 and B1, etc. Generally speaking, the relation between the texts of a pair of authors is considered to be perfect if the distances between leaf nodes of one author to the leaf nodes of the other author are identical.

Figure 10:
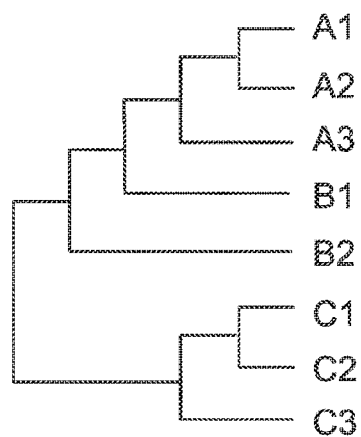
FIG. 10 illustrates a first example of an almost-perfect dendrogram.
Figure 11:
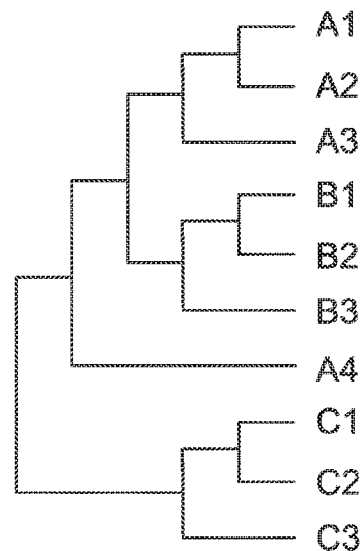
FIG. 11 illustrates a second example of an almost-perfect dendrogram.

A dendrogram will be called almost-perfect if a branch carrying one style is carried in another branch of different style. FIG. 10 thus illustrates a first example of an almost-perfect dendrogram. The texts from the author A are carried by the branch that carries the author B. In this figure, the distances between the texts from B are greater than the distances between the texts from A. FIG. 11 illustrates another example of an almost-perfect dendrogram. The texts from the author B are carried by the branch which carries the author A. Generally speaking, the relation between the texts of a pair of authors is considered to be almost-perfect if the maximum of the distances between leaf nodes of the texts from one author is smaller than the minimum of the distances between leaf nodes of the texts from the other author.

Figure 12:
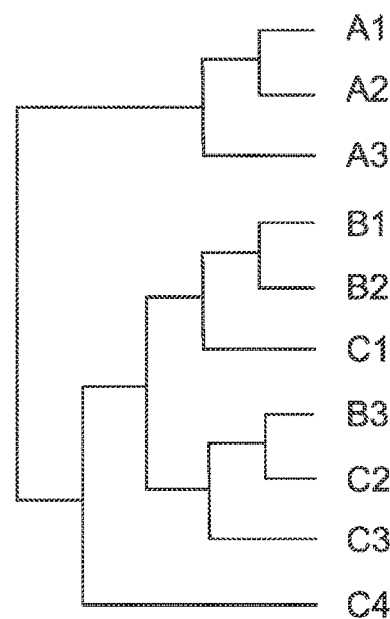
FIG. 12 illustrates one example of a dendrogram with two entangled branches.
Figure 13:
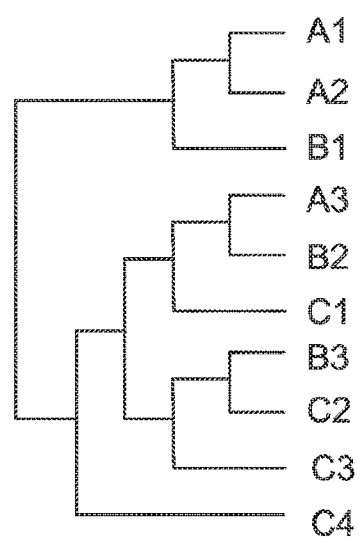
FIG. 13 illustrates one example of a dendrogram with three entangled branches.

A dendrogram will be called entangled in all the other cases. Thus, FIG. 12 illustrates one example of a dendrogram with a partial entanglement. The texts from the authors B and C are entangled. Neither the texts from the author B nor those from the author C end up being carried exclusively by a single branch. In this figure, the authors B and C are entangled, because neither the texts from the author B nor those from the author C end up being carried exclusively by a single branch of the dendrogram. FIG. 13, on the other hand, illustrates one example of a dendrogram with a generalized entanglement. The texts from the three authors are entangled. The texts from no author A, B or C end up being carried exclusively by a single branch. Generally speaking, the relationship between the texts from a pair of authors is considered as being entangled if the two preceding conditions (perfect or almost-perfect relationship) are not fulfilled.

By definition:
an entangled dendrogram contains at least one pair of authors with an entangled relationship;
an almost-perfect dendrogram does not contain any pair with an entangled relationship but at least one pair with an almost-perfect relationship;
a perfect dendrogram only contains pairs with a perfect relationship.

The examination of the dendrograms (UPGMA, Minimum Variance, WPGMA, NJ, etc.) may be done automatically for example by comparing the structures or the distances between the nodes or the branches of the dendrograms.

A preliminary automation step consists in verifying the starting hypothesis: a series of texts assigned to each author. This hypothesis is validated if each main branch carries exclusively the texts from one author. An automation of measurements of the distances between each leaf node allows the relevance of the starting hypothesis to be evaluated: the leaf nodes of a main branch will generally have shorter distances between them than those typically existing between a leaf node of a main branch and a leaf node of another main branch. The measurement of the distances for validating the distribution of the texts from an author on a main branch are verified in the majority of the dendrograms. One type of dendrogram, the ultrametric dendrogram, allows a strict verification of this last proposition.

A UPGMA dendrogram is ultrametric because it is rooted and the distances between its root and its leaf nodes are identical. This property of ultrametricity allows the examination of the UPGMA dendrograms to be strictly automated, for example by comparing all the distances between leaf nodes for each pair of authors.

As an alternative to the dendrograms, a multiple comparison experiment may be made based on a measurement of distance to the centroid barycenters defined for the sequences of each author. A score may be established.

In one variant, it is possible to avoid the use of the multivariate analysis (PCoA/PCA) for directly testing the queried fragments with dendrograms or measurements of distance to the centroid barycenters.

In one embodiment, the method may be used not only for authenticating the alleged author of a short text (in other words verifying if it is the true author), but also for identifying the author of an anonymous text or a text signed by another person. For this purpose, it is possible, based on a few texts, to undertake a search, within a collection of texts, for the texts which are the closest to reference texts (for example texts from suspects previously identified in a forensic application).

The method of the invention allows it to be determined whether a message (short text) may be assigned to a known author from whom at least one other short or long text is known. It allows for example subscribers to personal messages—for example twitter subscribers, or subscribers to other social networks or e-mail addressees—to verify that the short messages read come from the presumed author who has signed the message, and not from an impersonator.

This procedure may be repeated in order to compare a queried message with a few messages from presumed impersonators, and with a few messages from a reference author. If one of these three-way matches (unknown, impersonator, reference) classifies the queried message with those of the impersonator, the message is assigned, with a certain probability, to this impersonator. The method may be used in an anti-spam or anti-phishing application for determining, potentially with other methods, the probability that the message comes from an impersonator.

In an anti-spam or anti-phishing application, the impersonator may be a spammer.

The messages compared may relate to very different subjects, the approach being independent of the specific vocabulary used. The messages are however preferably of the same nature—for example all e-mails or disparaging messages.

Figure 6:
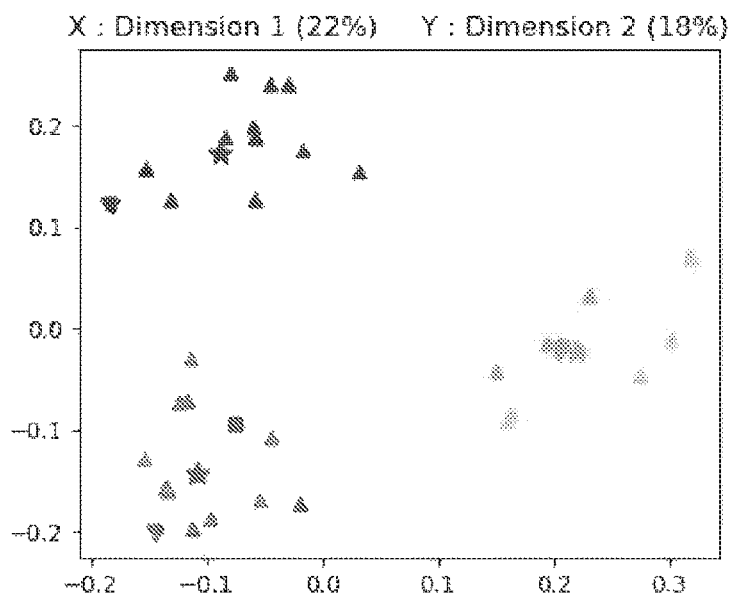
FIG. 6 shows the first two dimensions of an MSA on trigrams taken from the fragments of texts obtained after cutting up into around 500 characters.

FIG. 6 is taken from an example with three authors of dummy letters, each having produced two letters of around 500 and 1750 characters. The author queried (group on the bottom left) in this test has furthermore produced a document of around only one hundred characters (squares in the bottom left of the figure). These texts have been cut up to a preferred size of around 500 characters, with a degree of coverage of three.

FIG. 6 shows the first two dimensions of an MSA on trigrams taken from the fragments of texts obtained after cutting up into around 500 characters and overlapping (degree of coverage of 3). An F×N matrix (F=number of fragments and N=the number of dimensions retained in order to reach a cumulated percentage with a variance of 90%) corresponds to this MSA.

The matrix of coordinates resulting from this MSA is stored in a table.

Figure 7:
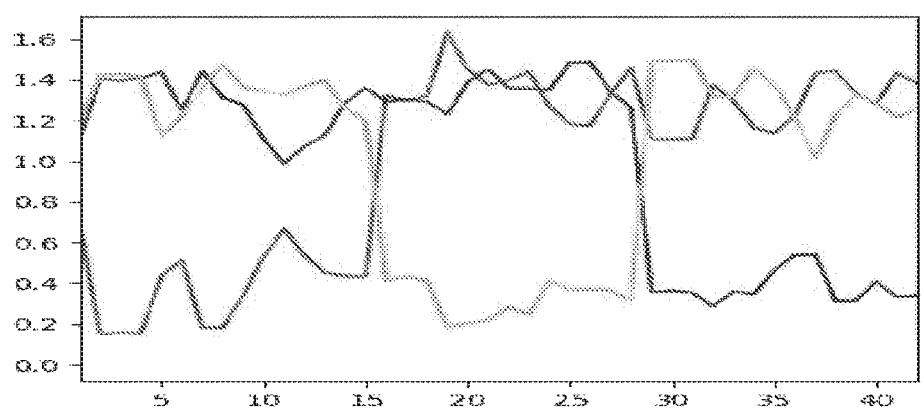
FIG. 7 is established from an MSA (like that in FIG. 6) and illustrates the distance of each fragment of text to the barycenters of three clusters.

FIG. 7 is established starting from an MSA and illustrates the distance of each fragment of text to the barycenters of the three clusters visible on this MSA. The figure shows, on the X-axis, the number of the extract and, on the Y-axis, the distance of this extract to the representative point. For example, the first 15 fragments are closer to the barycenter of the bottom left-hand cluster and therefore form part of this cluster.

This diagram allows the badly placed points of a cluster to be identified because they are closer to the barycenter of another cluster. It is therefore possible to calculate the proportion of badly placed points using the data for generation of this graphic and for determining the probability of the existence of three clusters corresponding to three different writing styles.

Figure 8:
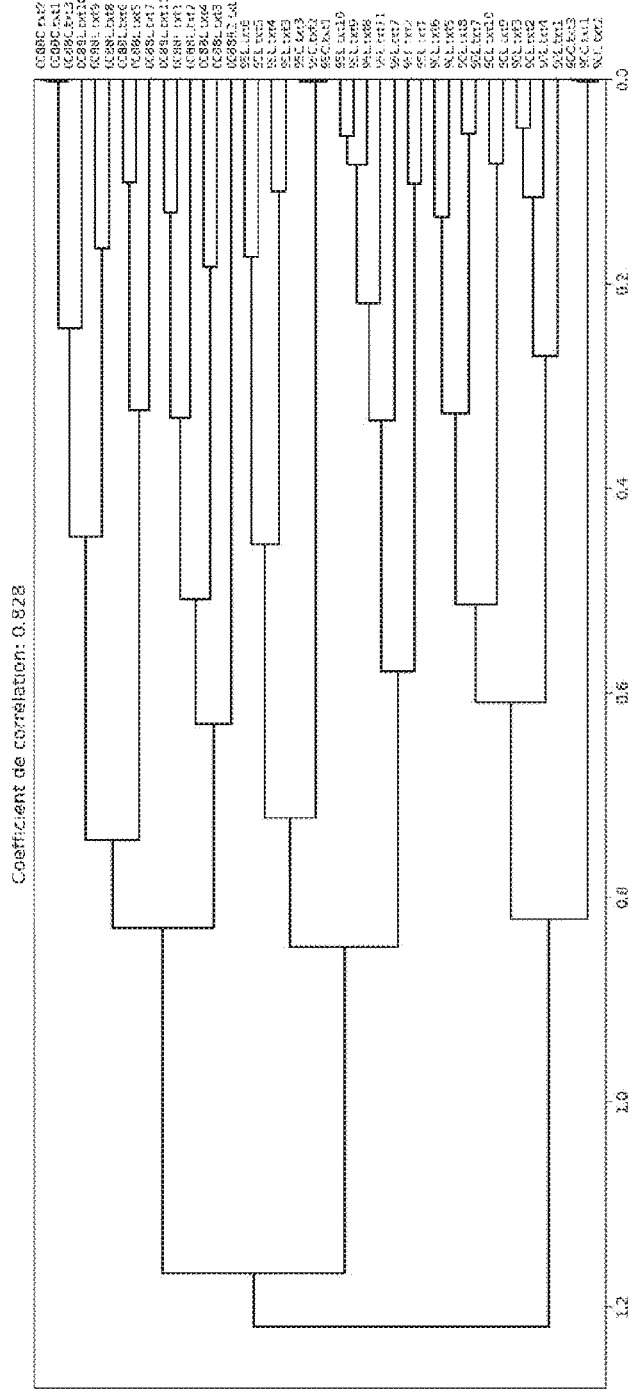
FIG. 8 illustrates one example of a dendrogram.

FIG. 8 shows the dendrogram obtained from the matrix of coordinates coming from an MSA. Three main branches (clusters) may be observed containing the fragments of the texts placed in the following order, from top to bottom: 88 (bottom left-hand cluster), 95 (top left-hand cluster) and 90 (right-hand cluster). This dendrogram of non-hierarchical clustering validates the existence and the clear separation of the three clusters, corresponding to three authors.

The technique for refining the dendrogram measures the statistical robustness of the results from this dendrogram. This dendrogram of non-hierarchical clustering therefore clusters the very short text of 130 characters (0088R2.txt1) with the other fragments coming from the two texts 0088L and 0088C, which all together constitute the bottom left-hand cluster.

The invention claimed is:

1. A method allowing to verify the authorship of a queried text of less than 500 characters, comprising the following steps:
    obtaining an electronic copy of at least one queried text and at least one reference text;
    normalizing the queried text and at least one reference text by means of a window-splitting module;
    cutting up at least one reference text into a plurality of windows by means of said window-splitting module;
    determining the number of occurrences of predefined patterns in said queried text by means of a stylistic module, said predefined patterns comprising exclusively intra and/or inter-word letter patterns, and analysing said numbers of occurrences
        provide a multivariate statistical analysis of said occurrences of the queried text, in such a manner as to generate a matrix of coordinates in an N-dimensional space;
        hierarchical clustering of the points of this space representable by a dendrogram by means of module for calculating stylometric distance;
        verification of the authorship of the queried text on the basis of this clustering.

2. The method as claimed in claim 1, said clustering comprising a UPGMA, Minimum Variance, WPGMA, or NJ method.

3. The method as claimed in claim 1, comprising the establishment of a measurement of robustness of the dendrogram by means of a cophenetic correlation coefficient.

4. The method as claimed in claim 1, comprising a step for determining whether the structure of the dendrogram is perfect, almost-perfect or nested.

5. The method as claimed in claim 1, comprising the comparison of the queried text with texts from several authors, and the assignment of the most probable author to the queried text.

6. The method as claimed in claim 5, comprising:
    calculation of the distance of the queried text (Q) with at least two other groups of texts (A and B) from known authors;

for each pair of groups (QQ, QA, QB, AA, AB and BB), calculation of the average of the distances between the fragments of texts from the two groups of the pair, with their standard deviation;

for each group, calculation of a confidence interval, which is the distance on either side of the average which contains a given proportion of the fragments of text from this group.

7. The method as claimed in claim 5, comprising a clustering of the fragments of queried texts into several groups of queried texts associated with several authors.

8. The method as claimed in claim 1, said multivariate statistical analysis and/or said clustering comprising the calculation of a Boolean distance between two texts.

9. The method as claimed in claim 1, said patterns corresponding
to trigrams; and/or
to bigrams with n intercalator letters; and/or
to bigrams at the start of words, in the middle of words or at the end of words, or to inter-word bigrams.

10. The method as claimed in claim 1, said patterns comprising occurrences of n-gram multigrams, with or without n intercalator letters.

11. The method as claimed in claim 1, said patterns comprising linking bigrams between two words, with or without intercalator word.

12. The method as claimed in claim 1, wherein said normalization of the queried text comprises eliminating the punctuation marks, replacing the upper case letters with lower case ones, and replacing the accented letters or other variations of the basic letters with the main form of the corresponding letters.

13. The method as claimed in claim 1, wherein said automatic cutting up of the queried text provides a plurality of windows, at least two windows intersecting, said windows being offset from one another by t characters, certain windows comprising a portion of the end of the text and a portion of the start of the text.

14. The method as claimed in claim 1, wherein said automatic cutting up of a reference text provides a plurality of windows, at least two windows intersecting, said windows being offset from one another by t characters, certain windows comprising a portion of the end of the text and a portion of the start of the text.

15. The method as claimed in claim 1, said analysis being based on a measurement of distance to the barycenters.

16. The method as claimed in claim 15, in which several queried texts are compared one after the other with texts from at least two reference authors.

17. The method as claimed in claim 1, in which:
it is tested first of all whether a group of queried texts is far from two other groups of reference texts, from known authors, with which it is compared;
if the group of queried texts is sufficiently far from the other two reference text groups, two sub-clusters of queried texts are created starting from the group of queried texts, according to their distance to one of said reference text groups, and the difference between the average of the cophenetic distances between the fragments of each sub-cluster with a reference text group is determined in order to determine whether the two sub-clusters come or do not come from the same author.

18. A data processing storage medium comprising a computer program designed to be executed by a processor in order to cause it to execute the method as claimed in claim 1, said data storage medium comprising a memory having a portion for the application programs comprising a window-spitting module, a module for determination stylistic parameters, a module for calculating stylistic distance and a module for identifying ruptures of styles.

19. The method of claim 1, wherein said multivariate statistical analysis of the queried text is selected from PCA or PCoA.

20. The method of claim 1, wherein said stylometric distance between the points resulting from the multivariate statistical analysis is an angular distance $\cos\theta$.

\* \* \* \* \*